UNITED STATES PATENT OFFICE.

HENRY V. DUNHAM, OF BAINBRIDGE, NEW YORK, ASSIGNOR TO NACIREMA CHEMICAL COMPANY, A CORPORATION OF VERMONT.

ART OF CONVERTING PHOSPHORITES.

1,034,090.             Specification of Letters Patent.    Patented July 30, 1912.

No Drawing.         Application filed July 7, 1911. Serial No. 637,291.

*To all whom it may concern:*

Be it known that I, HENRY V. DUNHAM, a citizen of the United States, residing at Bainbridge, in the county of Chenango and State of New York, have invented or discovered certain new and useful Improvements in the Art of Converting Phosphorites, of which the following is a specification.

This invention or discovery relates to the treatment of phosphorites or phosphate rock to render the same suitable for fertilizing purposes, and has for its object to so treat the phosphate rock, by a relatively inexpensive process, that the treated product will contain a relatively large percentage of "citrate soluble" or "water soluble" phosphate which is suitable for plant life, and which is known in the art as "available" phosphate.

It is well known that phosphate exists in natural phosphorites or phosphate rock in a form not immediately available for plant life, and that such rock must first be made available, either by the action of the soil on the rock or by some chemical process of treating the rock, before it is suitable for agricultural purposes. Many attempts have been made to secure a large percentage of available phosphate by methods other than the usual method which requires the rock to be treated with about its equal weight of sulfuric acid. Some of these attempts have comprised calcining methods, the more usual method consisting in adding to the finely ground rock certain chemicals and suitable fluxes and then heating the mixture to varying degrees in a blast furnace or indirectly through heating ovens. In most of these attempts to secure a high available content of "citrate soluble" or "water soluble" phosphate from the insoluble phosphorites, salts of soda or potash, or a mixture of the two, have been employed, although in some cases varying amounts of calcium salts have been added. So far as I am aware these processes have never come into practical commercial use, and doubtless one of the principal reasons is due to the fact that the soda and potassium salts also act as a flux, to a greater or less extent, on the silica content of the phosphorites, thus causing a considerable amount of fusion to take place, which is an objection if carried too far, and also from the fact that the addition of these salts acts as an adulterant, to a greater or less extent.

This invention or discovery consists in a method of treating natural phosphorites by means of acid, and then subsequently calcining the same, and by this method, when properly carried out, I convert a very large amount of the insoluble phosphorite into what is generally termed by the trade as "citrate soluble" and which is immediately available for plant life.

In carrying this invention or discovery into effect the phosphate rock is first ground to about 80 or 100 mesh. To the ground phosphorite is then added about 15%, by weight, of 50° Bé. sulfuric acid, and sufficient water to form a thin mud when the acid and water have been well mixed with the ground rock or phosphorite. As varying qualities of rock require varying percentages of acid, the invention is not to be understood as being limited to the use of 15% of the acid or to the use of 50° Bé. sulfuric acid. This acid is, however, mentioned because it is the usual commercial quality known as "chamber acid" used in the fertilizer industry.

An example of a mixture which has proved to be successful is as follows: 100 lbs. finely ground phosphate rock. 15 lbs. of 50° sulfuric acid, 30 lbs. of water. The acid is preferably added to the water and then this mixture to the pulverized rock. When the acid and water are added to the ground rock and thoroughly mixed therewith more or less heat is generated and the acid acts more or less upon the rock, which is not detrimental. When a thorough mixture of the above substances has been obtained the material is ready for calcining. The percentage of water stated is preferably employed in order to secure a thorough mixture of the small percentage of acid stated with the ground rock. Of course if more acid be used less water will be required. Also either the water or the acid might be first mixed with the ground rock and the other liquid might then be added. The mixture above mentioned, of rock, acid and water, is then heated in any suitable calcining furnace to a fairly high heat, depending somewhat upon the grade of rock used, but to a point from a dull red to a white heat, and this heating treatment is continued for about one hour, the length of time of the heating treatment depending somewhat upon the quality or grade of rock being treated. After the rock has been properly calcined it is removed from the furnace, and when it has cooled it is ground to a fine powder or from 80 to 100 mesh. It is then ready to be applied to the soil or mixed with other ingredients which are generally used in the manufacture of fertilizers. The phosphate in the rock treated as above described exists mainly in the form of a citrate soluble product, and is thus available for plant life. Just what chemical reaction takes place in the above described process has not been determined, but the result stated is probably largely due to the action of the nascent gases formed by the calcining process, as a large portion of the $SO_3$ added in the form of sulfuric acid is expelled from the mixture by the calcining process.

By the foregoing process phosphorites may be converted into suitable condition for use as fertilizers at very much less expense than is involved in the usual process of conversion, owing to the fact that in this new process only a relatively small amount of sulfuric acid is required.

Having thus described my invention or discovery I claim and desire to secure by Letters Patent:

The herein described process for converting phosphorites, consisting in mixing with the ground rock about 15% of its weight of sulfuric acid and about 30% of its weight of water, and then calcining the rock by subjecting the same to a high heat for about an hour.

In testimony whereof I affix my signature, in presence of two witnesses.

HENRY V. DUNHAM.

Witnesses:
 A. A. DUNHAM,
 O. L. CRUMB.